US005711493A

United States Patent [19]
Harris et al.

[11] Patent Number: 5,711,493
[45] Date of Patent: Jan. 27, 1998

[54] METHOD AND APPARATUS FOR STORING AND DISPENSING A ROLL OF PHOTOGRAPHIC WEB

[75] Inventors: Clark E. Harris; Paul J. Szwejbka, both of Fairport; Michael Leroy Koelsch, Rochester, all of N.Y.

[73] Assignee: Eastman Kodak Company, Rochester, N.Y.

[21] Appl. No.: 723,447

[22] Filed: Oct. 7, 1996

Related U.S. Application Data

[63] Continuation of Ser. No. 387,663, Feb. 13, 1995, abandoned.

[51] Int. Cl.$^6$ .......................... B65H 75/00; B65D 85/66; G03B 17/26
[52] U.S. Cl. .................. 242/588.5; 242/588.6; 242/348.4; 242/596.7; 396/511; 206/397; 206/410; 206/409
[58] Field of Search .................. 242/588.5, 588.6, 242/596.7, 348.4; 396/511; 206/397, 409, 410

[56] References Cited

U.S. PATENT DOCUMENTS

| | | | |
|---|---|---|---|
| 3,893,649 | 7/1975 | Cornell et al. | 248/99 |
| 4,531,685 | 7/1985 | White | 242/74.1 |
| 4,883,235 | 11/1989 | Niedospial | 242/348.4 X |
| 5,105,604 | 4/1992 | Harris et al. | 53/409 |
| 5,161,685 | 11/1992 | Harris et al. | 206/397 |
| 5,294,068 | 3/1994 | Baro et al. | 242/588.6 |

*Primary Examiner*—John Q. Nguyen
*Attorney, Agent, or Firm*—Susan L. Parulski

[57] ABSTRACT

A light-tight enclosure (10) for storing and dispensing a roll (12) of photosensitive web material (14) wound about a hollow cylindrical core (42) having open opposite ends (32, 34). The enclosure comprises a flexible opaque bag (16) with opposite sidewalls (18) extending between opposing rearward and forward portions (20, 22) and between opposing upper and lower portions (24, 26). Each sidewall has a central aperture (28, 30) therein congruent with each core end. The rearward portion defines a closable opening for receiving the roll. A shallow neck portion (36) projects from the forward portion to an end thereof defining an exit slot (40) for dispensing the web material. An annular ring (48) is light-tightly bonded to the inner surface of each sidewall congruent with the central apertures. Each ring has an annular flange (54) on its inner radial surface (56) which fits rotatably within a mating annular groove (47) in the outer surface of the core near the end of the core when the ring is fitted around the end of the core, providing thereby a light-lock between the rings and the core. Preferably, the outer diameter (44) of the core is reduced (46) near its ends to accommodate rings having substantially the same outer diameter as the central portion of the core. Preferably the core surface between the grooves and the ends of the core is formed into circumferentially alternating reliefs (62) and prominences (64) to facilitate installing the rings onto the core.

12 Claims, 4 Drawing Sheets

METHOD AND APPARATUS FOR STORING AND DISPENSING A ROLL OF PHOTOGRAPHIC WEB

CROSS-REFERENCE TO RELATED APPLICATIONS

This is a continuation of U.S. application Ser. No. 08/387,663, filed 13 Feb. 1995, abandoned, titled METHOD AND APPARATUS FOR STORING AND DISPENSING A ROLL OF PHOTOGRAPHIC WEB by Clark E. Harris, Paul J. Szwejbka, and Michael L. Koelsch.

DESCRIPTION

FIELD OF THE INVENTION

The invention relates generally to enclosing photosensitive material, and particularly to a method and an apparatus for light-tightly enclosing a roll of photosensitive material.

BACKGROUND OF THE INVENTION

In the past, rolls of photosensitive color-print paper web have been supplied to minilab stations in either of two ways. In one, the paper has been enclosed within a light-tight paper bag; in the other, within an injection-molded disposable cartridge. Each container protects the paper stock roll therein from physical damage and light during storage, transport, and loading into the minilab machine. The disposable cartridge is both costly and wasteful. A typical paper bag container must be unloaded in the dark, in order to safely transfer its stock roll from the bag to a reusable cartridge at a minilab. Such work in the dark can be awkward and time-consuming, and the stock roll of photosensitive paper can be easily damaged or light-struck through mishandling. There has thus been a need for a practical, convenient, and reliable method of light-tightly enclosing a photosensitive paper stock roll so that it can be efficiently and safely supplied to a minilab work station without requiring the minilab operator to work in the dark, preferably by an enclosure that can be left in place and daylight-loaded into either a minilab cartridge or into the minilab machine itself, and preferably by an enclosure that is not only economical to make and use but also is readily recyclable for further use of its constituent parts.

U.S. Pat. Nos. 5,105,604 issued Apr. 21, 1992, and 5,161,685 issued Nov. 10, 1992, both issued to Harris et al. and hereby incorporated by reference, disclose method and apparatus for enclosing, storing, and dispensing a roll of photosensitive web material wound about a hollow cylindrical core having open opposite ends. The enclosure comprises a flexible opaque bag with opposite sidewalls extending between opposing rearward and forward portions and opposing upper and lower portions. Each sidewall has a central aperture therein congruent with each core end. The rearward portion defines a closable opening for receiving the roll. A shallow neck portion projects from the forward portion to an end thereof defining an exit slot for dispensing the web material. A collar fits tightly inside each core end, with an annular flange thereon facing axially outward. An annular ring is attachable to each collar in spaced, inward-facing relation to the flange. The roll is first positioned in the bag, through its closable opening, so that the web material extends into the neck portion and out through the exit slot, and so that a central portion of the collar at each core end projects outwardly through the adjacent sidewall aperture, with its flange left inside the sidewall and facing an annular portion thereof surrounding the aperture. The annular ring is then attached to the outwardly projecting portion of the collar in closely spaced, inward-facing relation to the sidewall annular portion, which is thus loosely trapped between the flange and the ring. The bag opening is then closed, and the bag neck portion is folded back and secured against the bag forward portion.

The invention disclosed in '604 and '685 can function to enclose, store, and dispense photosensitive web. However, three problems remain. First, the resulting configuration of a standard core with collars, flanges, and rings increases significantly the overall axial dimension of the assembly, preventing it from being used in some commercially-available or existing minilab cartridges. Second, the method of assembly requires an operator, working in the dark, to find by feel the pre-punched openings in the sidewalls of the bag, to properly fit the bag around each collar extension outboard of the collar flange, and to secure the annular ring to the collar, trapping the sidewall uniformly between the inside flange and the outside ring. This can be time-consuming and difficult, requiring substantial skill on the part of the operator, and has significant potential for operator error. Third, because the sidewall is not attached to the core/lightlock assembly and is only trapped loosely between the inner and outer flanges, it can be inadvertently pulled loose through mishandling, which can result in the web's becoming lightstruck.

It is a principal object of the invention to provide an improved light-tight enclosure for storing and dispensing photosensitive web which enclosure has an overall axial dimension which permits the enclosure to be used in a minilab cartridge.

It is a further object of the invention to provide an improved light-tight enclosure for storing and dispensing photosensitive web which reduces the dark-requiring assembly steps and increases the ease and reliability of assembly.

It is a still further object of the invention to provide an improved light-tight enclosure for storing and dispensing a roll of photosensitive web wherein the sidewall is light-tightly sealed to at least one core assembly component and the roll is allowed to turn with its core past the stationary sidewall during dispensing.

SUMMARY OF THE INVENTION

Our invention is defined by the claims. The apparatus and method of the invention are useful in providing an enclosure, including a bag and cooperating core, for storing and dispensing a roll of photosensitive web; which enclosure is simple to assemble in the dark, provides a positive light-tight seal of the enclosure sidewall, and, when assembled with the roll wound about the cooperating core, can fit within a commercially-available minilab cartridge for dispensing of web.

Briefly described, our invention includes a hollow core having a length substantially equal to the width of the web, and preferably having a region of reduced outer diameter near each end, with an annular groove in the surface of the core in each region. A ring having an annular flange on its inner periphery is rotatably disposed on and retained by each core region having reduced diameter, the flange of the ring riding in the annular groove in the core and joining therewith to provide a lock against the passage of light between the ring and the core. (A "light-lock" as used herein is taken to mean an interleaving or interference of mechanical elements whereby light is prevented from passing between those elements.) Alternatively, the annular flange can be disposed on the core and the annular groove in the inner radial surface of the ring. The overall axial length of the core and both rings when assembled is substantially the same as the length of the core itself. The core and both rings are disposed within a bag similar to the bag disclosed in '604 and '685 and congruent with openings in the sidewalls, and the sidewalls are secured to axial surfaces of the rings as by thermal welding.

In a preferred embodiment, the core ends are chamfered and the core outer surface is relieved in a plurality of radial segments between the annular grooves and the ends of the core to facilitate mounting of the flanged rings onto the core. Such segmented relieving does not impair the integrity of the light lock. Preferably the core surface is relieved in three equally-spaced segments of about 60° each.

In a preferred method in accordance with the invention, each ring is disposed in proper final location within the bag before the sidewall openings have been made and before the roll is loaded into the bag. The rings are then secured to the inner surfaces of the respective sidewalls, preferably by thermal welding, and sidewall openings are punched through the rings. These steps can be performed in a lighted environment, providing thereby a bag having rings already joined to the sidewall and accurately disposed concentrically about the openings. The subsequent dark assembly of a roll of web into the prepared bag consists of a combination of the known step of positioning the roll in the bag through its closable opening so that the leading end of the web extends through the exit slot; and the novel steps of positioning the core so that its ends are adjacent to the rings mounted on the sidewalls, and pressing the rings over the preferably chamfered and segmented ends of the cores until the flanges of the rings snap into the annular grooves on the cores, thereby locking the core into light-tight, rotatable relationship with the rings, and hence with the bag. The bag is then closed and secured in known fashion.

BRIEF DESCRIPTION OF THE DRAWINGS

The foregoing and other objectives, features, and advantages of the invention will be apparent from the following more particular description, including the presently preferred embodiment of the invention, as illustrated in the accompanying drawings in which.

DETAILED DESCRIPTION OF THE INVENTION

Our invention provides a flexible enclosure for storing and dispensing light-sensitive web material on a hollow core, which enclosure has sidewall openings proximate to and congruent with the core to permit mounting of the core on a mandrel of a minilab cartridge. To prevent the web material from becoming light-struck, the sidewalls of the enclosure are sealingly attached to stationary rings within the bag, concentric with the sidewall openings. Each ring has a flange on its inner radial surface which matably and rotatably engages a groove in the outer surface of the core near the end of the core to form a lock preventing the passage of light between each ring and the core. Alternatively, each ring may have a groove in its inner radial surface which matably and rotatably engages a flange on the outer surface of the core. Preferably, the outer diameter of the core is reduced in the region where the rings are disposed so that the rings can have substantially the same outer diameter as the central portion of the core and so that the overall length of the core with the rings installed is substantially the same length as the core itself, permitting the assembly to fit within existing minilab cartridges.

Figure 1:
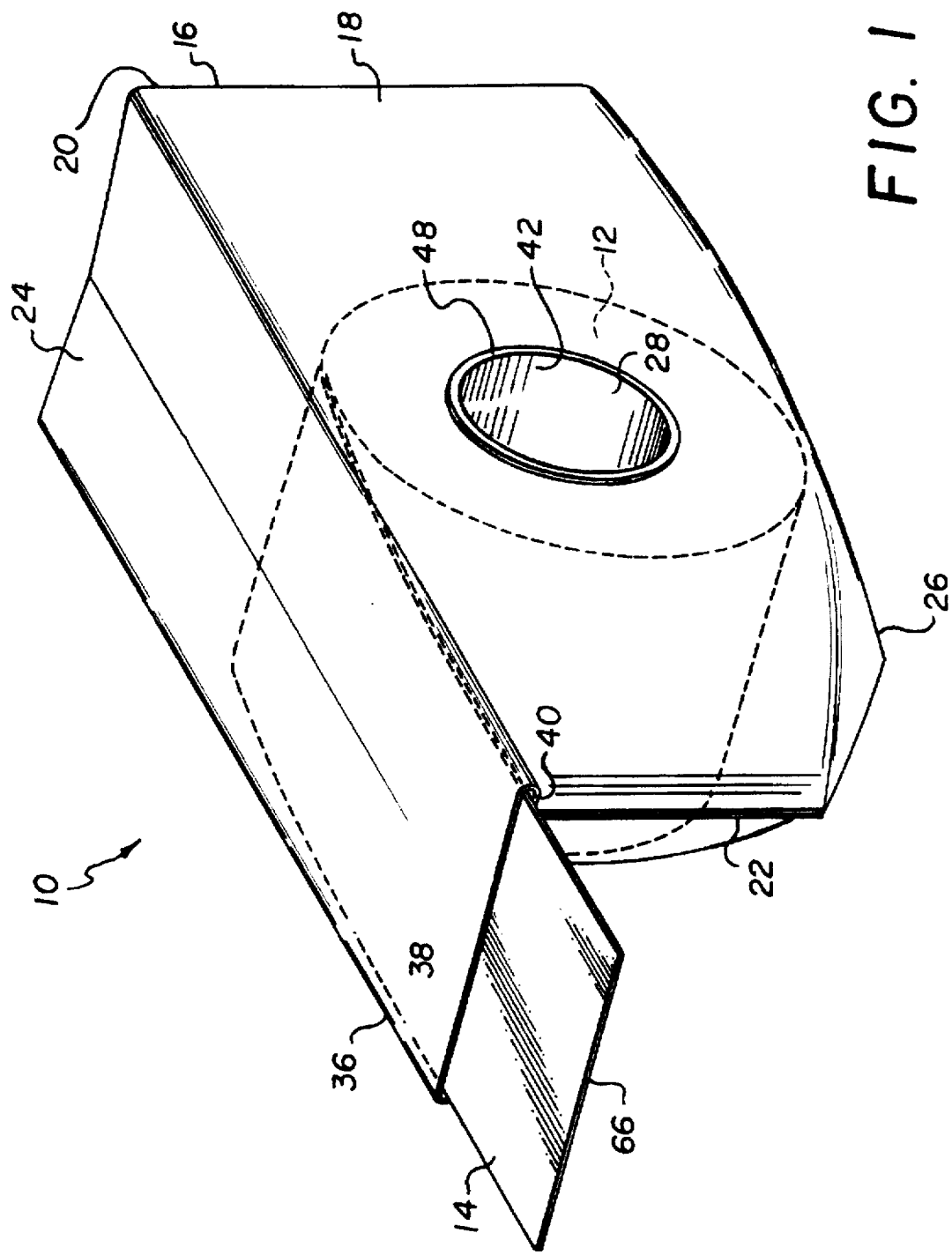
FIG. 1 is a perspective view depicting a flexible enclosure in accordance with the invention, showing a completed assembly ready to dispense web.
Figure 2:
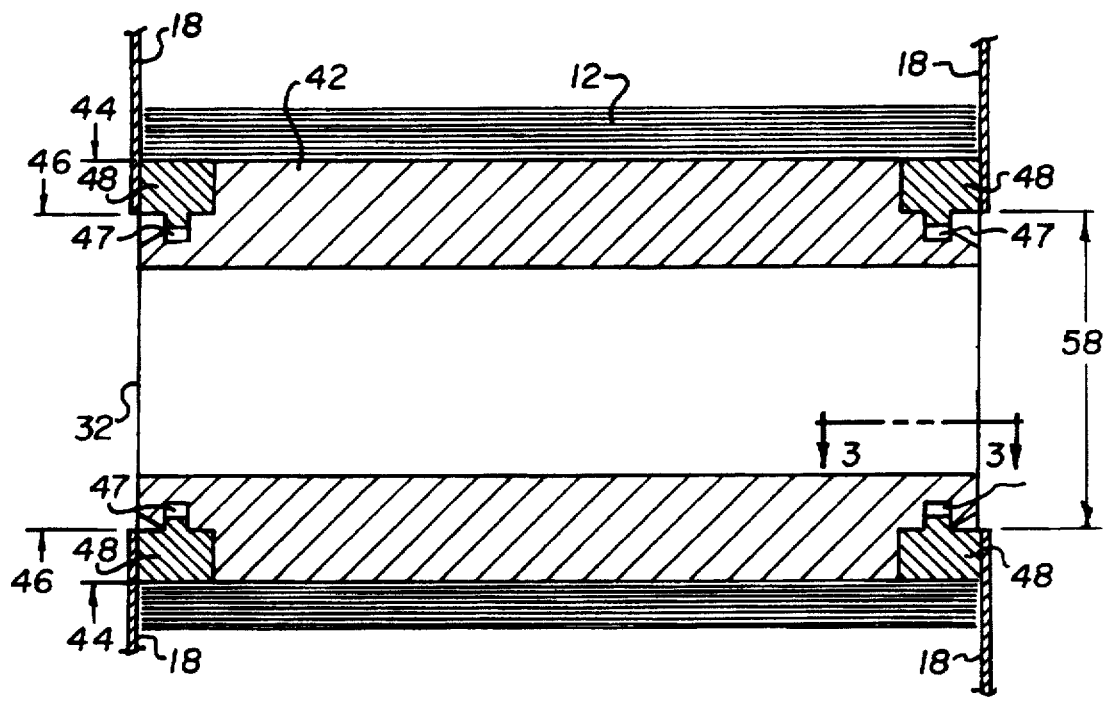
FIG. 2 is a cross-sectional view of a central portion of the flexible enclosure shown in FIG. 1, taken along a plane including the axis of the core assembly and showing the light-locking relationship of the core, rings, and sidewalls of the bag.
Figure 3:
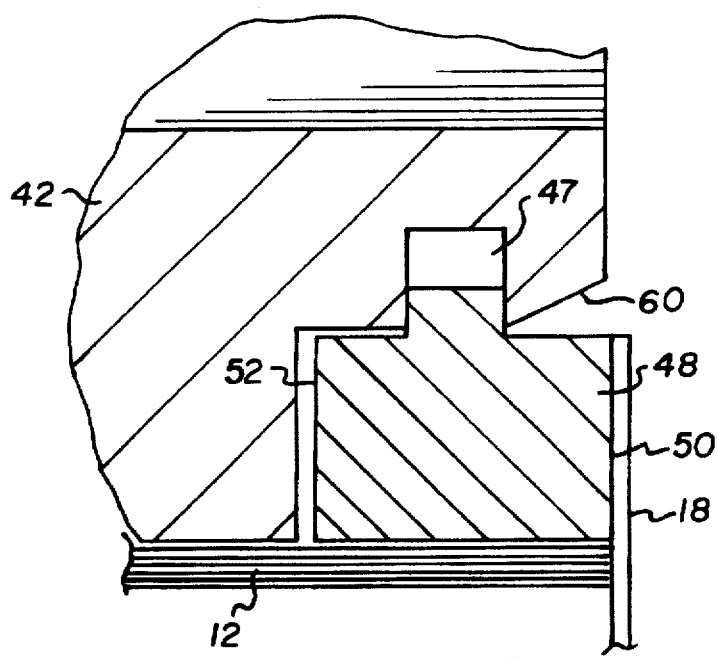
FIG. 3 is an enlarged view of a portion of the cross-sectional view shown in FIG. 2.
Figure 6:
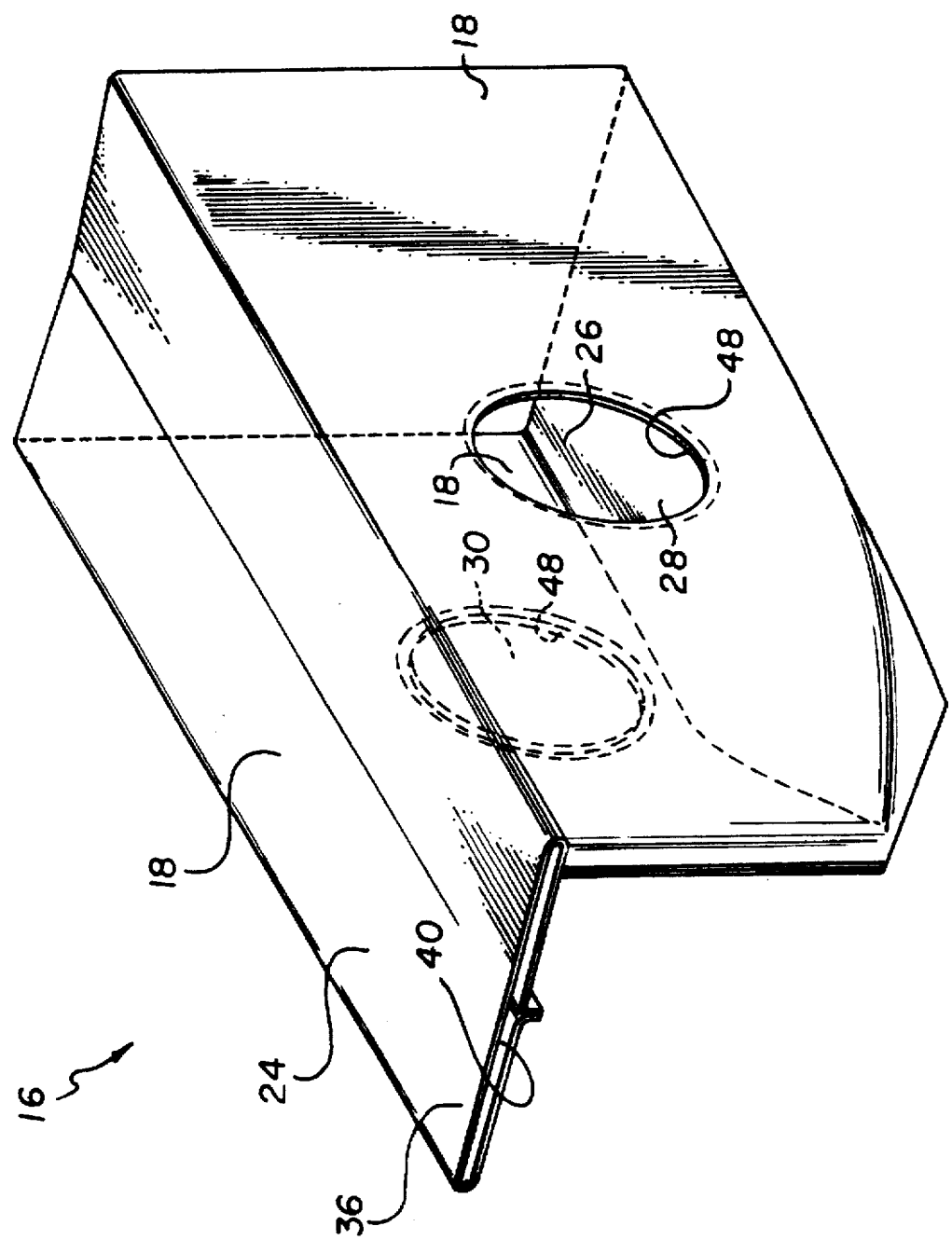
FIG. 6 is a perspective view depicting the flexible enclosure shown in FIG. 1 partially assembled in accordance with a method of the invention.

Referring to FIG. 1, a flexible enclosure 10 of this invention is adapted to light-tightly store photosensitive roll 12 therein and dispense its web material 14 for use in, for example, a minilab photographic paper cartridge. Enclosure 10 comprises a flexible opaque bag 16, preferably made from a thin, flexible, plastic, opaque sheet material such as high-density polyethylene approximately 0.005 inches (0.127 mm) thick. Configured to enclose roll 12, bag 16 includes a pair of opposite sidewalls 18 (one shown) extending between opposing rearward and forward portions 20 and 22, respectively, and between opposing upper and lower portions 24 and 26, respectively. Each of the bag sidewalls 18 has a centrally disposed aperture 28 and 30, respectively, therein (see FIG. 6) that is substantially congruent with one of the core ends 32 and 34. The bag rearward portion 20 initially defines a closable opening through which roll 12 can be inserted into the bag. Bag 16 further includes a shallow neck portion 36 that projects forwardly from bag forward portion 22 to a distal end 38 thereof defining an exit slot 40 through which the strip of web material 14 can be withdrawn from the bag.

As shown more clearly in FIGS. 2 through 5, enclosure 10 also comprises a hollow, cylindrical core 42 about which web material 14 is wound to form roll 12. Core 42 has a nominal outer diameter 44, for example 1.50 inches (38 mm) over most of its length whereon it supports web 14. Core 42 can have any desired length to support a web of any width, the core having substantially the same length as the web of the web. Core 42 can be formed from a wide variety of photo-inert materials, preferably plastic, for example, butyrate, PVC polymer, or high-density polyethylene.

Core 42 has a region of reduced outer diameter 46 near each end to accommodate installation of annular rings 48 on core 42 radially between the core and the first convolution of web material 14. In the region of reduced diameter, core 42 is provided with an annular groove 47. Preferably, each ring 48 is planar on both its axial surfaces 50 and 52 and has an annular flange 54 disposed on its radial inner surface 56. Flange 54 is sized to be slightly smaller axially and slightly larger radially than annular groove 47. Ring 48 has an outer diameter substantially the same as outer diameter 44 of core 42, and an inner diameter 58 slightly larger than reduced diameter 46 of core 42. Thus, when rings 48 are forced over the ends of core 42, the annular flanges of the rings snap into the annular grooves of the core, forming a lock to the passage of light between the rings and the core, and because of the aforementioned dimensioning, the core is free to rotate within the rings.

Rings 48 can be formed from a wide variety of photo-inert materials, for example, butyrate, PVC polymer, or preferably high-density polyethylene. A characteristic of such material is that it be light-tightly attachable, as by adhesives or preferably by thermal welding, to the inner surface of bag sidewalls 18.

Figure 4:
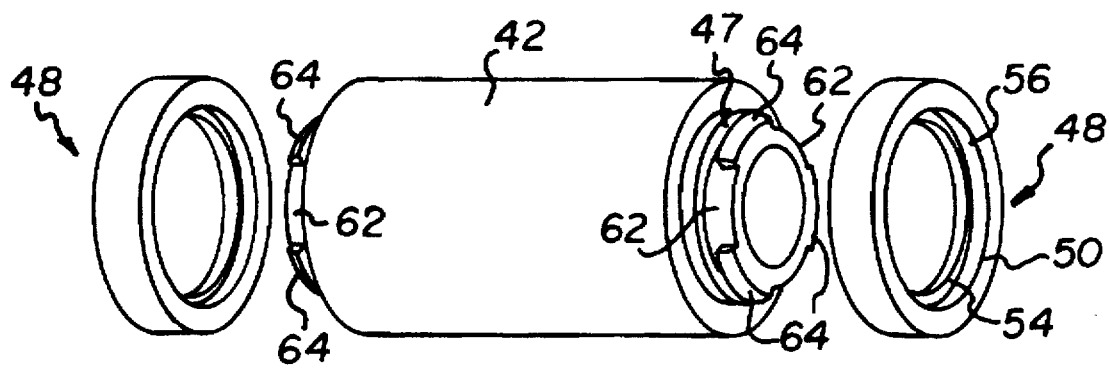
FIG. 4 is an exploded partial perspective view showing a core and light-locking rings in accordance with the invention.
Figure 5:
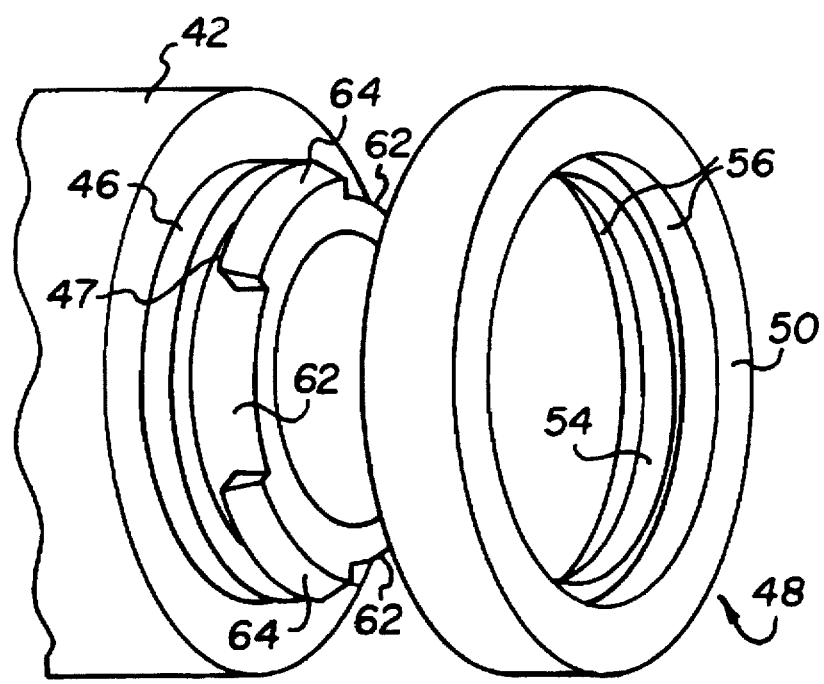
FIG. 5 is an enlarged view of an end of the exploded assembly shown in FIG. 4, showing detail of mating means on the core and receiving means on the ring.

To facilitate passage of the rings over the ends of the core, preferably, the outer periphery of the ends of core 42 are chamfered at 60 to any convenient angle from axial, for example 30°. We have found that facilitation can be further improved by relieving the outer surface of the core between annular groove 47 and the end of the core in a plurality of radial locations, preferably three segments 60° wide spaced symmetrically at 120° from each other, as shown in FIGS. 4 and 5. The reliefs 62 permit flange 54 to engage groove 47 progressively by deforming slightly to pass over the prominences 64 remaining between reliefs 62 one at a time. Preferably the reliefs should number between 2 and 7, as should the number of prominences. If greater than 7 reliefs are used, assembly of the rings to the core may not be appreciably eased. We have also found that providing the reliefs, which removes the outer wall of the annular groove in the area of the relief, does not impair the integrity of the light-lock formed between the ring and the core.

In a method for light-tightly enclosing a roll 12 of photosensitive web material 14 to store and dispense the material for use in a cooperating apparatus such as a minilab cartridge, a bag 16 is formed substantially as disclosed in the above-incorporated references, except that no sidewall openings are provided during forming of the bag. The bag 16 has a closable opening in, preferably, the rearward portion 20. Protected from light, a roll 12 of the web material 14 is provided on a core 42 configured as described hereinabove, having chamfered ends 60, a region 46 of reduced outer diameter near each end, an annular groove 47 in the outer surface in such regions, and three reliefs 62 alternating with three prominences 64 in each such region. Two annular rings 48 are provided, configured as described hereinabove. Preferably in light, the rings 48 are inserted into the bag 16 through the closable opening and are disposed coaxially with each other on a central location of the inner surfaces of the opposite bag sidewalls 18. The outer axial planar surface 50 of each ring is then attached light-tightly over substantially its entire surface to the bag sidewall 18 as by thermal welding by ultrasonic energy or other known means. The sidewall material enclosed by the ring is then removed by known means such as punching or die-cutting, providing thereby coaxial openings 28 and 30 in the sidewalls adapted to receive a mounting mandrel of a minilab processor cartridge (not shown). In the dark, the roll of photosensitive material on its core is inserted into the bag through the closable opening, and the leading end 66 of the web material 14 is led through, to protrude from, the exit slot 40 in the neck portion 36 of the bag. The roll is positioned within the bag such that the core is substantially aligned with the rings and openings in the sidewalls. The rings are then rotatably mated onto the ends of the core, the annular flanges 54 being snapped into the annular grooves 47, to form light-locks at each end of the core, which light-locks permit the rings to remain stationary with the bag while the core is rotated to dispense the web through the exit slot. Lastly, the closable opening is closed by known means, as by sealing by thermal welding or by adhesive or tape.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Parts List 10 flexible enclosure
12 photosensitive roll in 10
14 web material of 12
16 bag of 10
18 sidewalls of 16
20 rearward portion of 16
22 forward portion of 16
24 upper portion of 16
26 lower portion of 16
28 first opening in 18
30 second opening in 18
32 first end of 42
34 second end of 42
36 neck portion of 22
38 distal end of 22
40 exit slot from 10
42 core
44 outer diameter of 42
46 reduced outer diameter of 42
47 annular grooves in 42
48 annular rings
50 first axial surface of 48
52 second axial surface of 48
54 annular flange on 48
56 radial inner surface of 48
58 inner diameter of 48
60 chamfer on ends of 42
62 reliefs on regions of 46
64 prominences on regions of 46
66 leading end of 14

What is claimed is:

1. A flexible enclosure for storing and dispensing a roll of photosensitive web material for use in cooperating apparatus, said enclosure comprising:

a) a flexible opaque bag configured to enclose the roll, said bag including first and second opposite sidewalls extending between opposing rearward and forward portions and between opposing upper and lower portions, each of said sidewalls having an inner surface and a centrally disposed aperture therein, said apertures having colinear axes, said rearward portion defining a closable opening through which the roll can pass into said bag, said bag further including a shallow neck portion projecting forwardly from said forward portion to a distal end thereof defining an exit slot through which the strip of web material can pass;

b) a one-piece hollow cylindrical core having a first mating means near a first end thereof; and c) a first one-piece ring non-rotatably secured to the inner surface of the first of said opposite sidewalls in concentric relationship with said centrally disposed aperture in said first sidewall, said first ring having first receiving means adapted to receive and rotatably mate with said first mating means on said core to form a lock against the passage of light between said first ring and said core.

2. A flexible enclosure in accordance with claim 1 further comprising a second one-piece ring non-rotatably secured to the inner surface of the second of said opposite sidewalls in concentric relationship with said centrally disposed aperture in said second sidewall, said second ring having second receiving means adapted to mate rotatably with a second mating means on a second end of said core opposite said first end to form a lock against the passage of light between said second ring and said core.

3. A flexible enclosure in accordance with claim 1 wherein said first receiving means comprises an annular flange on the inner radial surface of said ring.

4. A flexible enclosure in accordance with claim 3 wherein said first mating means on said core comprises a region of reduced outer diameter near an end of said core, said region having an annular groove which matingly cooperates with said flange on said ring.

5. A flexible enclosure in accordance with claim 4 wherein a surface of said core between said annular groove and the end of said core includes a plurality of reliefs radially arranged about the circumference of the core for facilitating mating cooperation between said annular groove and said annular flange.

6. A flexible enclosure in accordance with claim 1 wherein said end of said core is chamfered at the core's outer periphery.

7. A flexible enclosure in accordance with claim 1 wherein said bag is made from a plastic material including high density polyethylene.

8. An assembly for storing and dispensing photosensitive web, comprising:

a) a flexible opaque bag configured to enclose the roll, said bag including first and second opposite sidewalls extending between opposing rearward and forward portions and between opposing upper and lower portions, each of said sidewalls having an inner surface and a centrally disposed aperture therein, said apertures having colinear axes, said bag further including a shallow neck portion projecting forwardly from said forward portion to a distal end thereof defining an exit slot through which the strip of web material can pass;

b) a one-piece hollow cylindrical core disposed in said bag having first and second ends and first and second mating means near said first and second ends thereof, respectively;

c) a first one-piece ring non-rotatably secured to the inner surface of the first of said opposite sidewalls in concentric relationship with said centrally disposed aperture in said first sidewall, said first ring having first receiving means receiving and rotatably mating with said first mating means of said core to form a lock against the passage of light between said first ring and said core;

d) a second one-piece ring non-rotatably secured to the inner surface of the second of said opposite sidewalls in concentric relationship with said centrally disposed aperture in said second sidewall, said second ring having second receiving means receiving and rotatably mating with a second mating means on a second end of said core opposite to said first end to form a lock against the passage of light between said second ring and said core, said first and second ends of said core being chamfered to facilitate mating of said first and second receiving means with said first and second mating means, respectively; and e) an elongated strip of photographic web material wound about said core, a leading end portion of said strip extending from said exit slot.

9. An assembly in accordance with claim 8 wherein each of said first and second mating means of said core includes a region of reduced outer diameter near each end, each of said regions having an annular groove.

10. An assembly in accordance with claim 8 wherein said first and second receiving means comprises an annular flange on the inner radial surface of each of said first and second rings, respectively.

11. A flexible enclosure for storing and dispensing a roll of photosensitive web material for use in cooperating apparatus, said enclosure comprising:

a) a flexible opaque bag configured to enclose the roll, said bag including first and second opposite sidewalls extending between opposing rearward and forward portions and between opposing upper and lower portions, each of said sidewalls having an inner surface and a centrally disposed aperture therein, said apertures having colinear axes, said rearward portion defining a closable opening through which the roll can pass into said bag, said bag further including a shallow neck portion projecting forwardly from said for, yard portion to a distal end thereof defining an exit slot through which the strip of web material can pass;

b) a one-piece hollow cylindrical core having an end and an annular groove near said end; and c) a one-piece ring non-rotatably secured to the inner surface of the first of said opposite sidewalls in concentric relationship with said centrally disposed aperture in said first sidewall, said ring having an annular flange which matingly cooperates with said annular groove on said core to form a lock against the passage of light between said ring and said core, said end having a chamfer to facilitate matingly cooperation between said annular groove and said annular flange, said annular grooves of said core rotatably mounted within said annular flange of said ring.

12. A flexible enclosure in accordance with claim 11 wherein an outer surface of said core includes a plurality of prominences and reliefs for facilitating mating cooperation between said annular groove and said annular flange.

* * * * *